(12) United States Patent
Murakami et al.

(10) Patent No.: US 8,822,591 B2
(45) Date of Patent: Sep. 2, 2014

(54) PIGMENT DISPERSIONS

(75) Inventors: Yoshikazu Murakami, Chuo-ku (JP); Hiroyuki Shimanaka, Chuo-ku (JP); Toshiyuki Hitotsuyanagi, Chuo-ku (JP); Shinya Tsuchida, Chuo-ku (JP); Atsushi Goto, Uji (JP); Yoshinobu Tsujii, Uji (JP); Takeshi Fukuda, Uji (JP)

(73) Assignees: Dainichiseika Color & Chemicals Mfg. Co., Ltd., Chuo-ku, Tokyo (JP); Kyoto University, Kyoto-shi, Kyoto (JP)

( * ) Notice: Subject to any disclaimer, the term of this patent is extended or adjusted under 35 U.S.C. 154(b) by 444 days.

(21) Appl. No.: 12/737,659

(22) PCT Filed: Aug. 5, 2009

(86) PCT No.: PCT/JP2009/063878
§ 371 (c)(1),
(2), (4) Date: Feb. 1, 2011

(87) PCT Pub. No.: WO2010/016523
PCT Pub. Date: Feb. 11, 2010

(65) Prior Publication Data
US 2011/0136965 A1 Jun. 9, 2011

(30) Foreign Application Priority Data
Aug. 5, 2008 (JP) .................................. 2008-201411

(51) Int. Cl.
C08F 8/30 (2006.01)
C08F 297/00 (2006.01)
C09D 7/00 (2006.01)
C09D 11/10 (2014.01)
C09D 153/00 (2006.01)
C09D 17/00 (2006.01)
C08L 53/00 (2006.01)
C08F 293/00 (2006.01)

(52) U.S. Cl.
CPC .............. *C09D 11/10* (2013.01); *C08F 297/00* (2013.01); *C09D 7/007* (2013.01); *C09D 153/00* (2013.01); *C09D 17/003* (2013.01); *C08L 53/00* (2013.01); *C08F 293/005* (2013.01)
USPC .......................................... 524/555; 525/294

(58) Field of Classification Search
USPC ............................. 524/548, 555; 525/286, 294
See application file for complete search history.

(56) References Cited

U.S. PATENT DOCUMENTS 4,656,226 A * 4/1987 Hutchins et al. ................ 525/93
6,319,967 B1 11/2001 Coca et al.
6,485,788 B1 11/2002 Coca et al.
6,849,679 B2 2/2005 Auschra et al.
2004/0143032 A1 * 7/2004 Auschra et al. ............... 523/160

FOREIGN PATENT DOCUMENTS

| JP | 47-013366 | | 4/1972 |
|---|---|---|---|
| JP | 2000-500516 | A | 1/2000 |
| JP | 2000-514479 | A | 10/2000 |
| JP | 2000-515181 | A | 11/2000 |
| JP | 2002-523578 | A | 7/2002 |
| JP | 2003-049110 | A | 2/2003 |
| JP | 2003-064139 | A | 3/2003 |
| JP | 2006-063277 | A | 3/2006 |
| JP | 2006-328309 | A | 12/2006 |
| JP | 2007-277533 | A | 10/2007 |
| WO | WO 97/18247 | A1 | 5/1997 |
| WO | WO 98/01478 | A1 | 1/1998 |
| WO | WO 98/01480 | A1 | 1/1998 |
| WO | WO 99/05099 | A1 | 2/1999 |
| WO | WO 00/40630 | A1 | 7/2000 |

OTHER PUBLICATIONS

Japan Patent Office, Office Action in Japanese Patent Application No. 2010-523880, Jul. 31, 2012.
European Patent Office, Extended European Search Report for European Patent Application No. EP 09 80 5006, Jan. 20, 2012, European Patent Office, Munich, Germany.
Hawker, C., et al., New Polymer Synthesis by Nitroxide Mediated Living Radical Polymerizations, Chemical Review, vol. 101, No. 12, 2001, pp. 3661-3688.
Kamigaito, M., et al., Metal-Catalyzed Living Radical Polymerization, Chemical Review, vol. 101, No. 12, 2001, pp. 3689-3745.
Yamago, S., et al., Organotellurium Compounds as Novel Initiators for Controlled/Living Radical Polymerizations, Journal of the American Chemical Society, vol. 124, No. 12, 2002, pp. 2874-2875.
Yamago, S., et al., Tailored Synthesis of Structurally Defined Polymers by Organotellurium-Mediated Living Radical Polymerization (TERP), Journal of the American Chemical Society, vol. 124, No. 46, 2002, pp. 13666-13667.
Goto, A., et al., Mechanism-Based Invention of High-Speed Living Radical Polymerization Using Organotellurium Compounds and Azo-Initiators, Journal of the American Chemical Society, vol. 125, No. 29, 2003, pp. 8720-8721.

* cited by examiner

*Primary Examiner* — David W Wu
*Assistant Examiner* — Marie Reddick
(74) *Attorney, Agent, or Firm* — Taft Stettinius & Hollister LLP

(57) ABSTRACT

Disclosed is a pigment dispersion containing at least a pigment, a liquid medium and a high-molecular dispersant. The high-molecular dispersant is a block polymer represented by A-B or A-B-C, in which A, B and C each represent a polymer block and the A and C blocks may be the same or different. The block polymer and its production process are also disclosed. The high-molecular dispersant is free of problems of a smell, coloration, a heavy metal and cost, and its use can provide a pigment dispersion excellent in the dispersion stability of a pigment.

6 Claims, No Drawings

PIGMENT DISPERSIONS

TECHNICAL FIELD

This invention relates to a block polymer which can be obtained by a novel polymerization process and is controlled in structure. The novel polymerization process is easy to polymerize monomers, assures a good polymerization yield, uses materials which are economical and do not place much load on the environment, and requires no special compound or compounds. The present invention is also concerned with a pigment dispersion containing the block polymer as a high-molecular dispersant and also with its use.

BACKGROUND ART

Acrylic copolymers, a kind of polymers formed from ethylenically-unsaturated monomers (which may hereinafter be called simply "monomers"), are used in a variety of fields such as high-molecular dispersants, paints, binders, and self-adhesives. Many of these acrylic copolymers are produced by general radical polymerization. According to such general radical polymerization, however, a termination reaction such as the recombination of propagating radicals themselves or a disproportionation reaction takes place, thereby making it difficult to control the molecular weight distribution of the resulting polymer. Moreover, end radicals of the polymer are deactivated during the polymerization so that, even when another monomer is added and polymerized after the polymerization is conducted, the polymer cannot be formed into a block polymer.

Upon producing a pigment dispersion of high pigment concentration, on the other hand, it is difficult to stably disperse a pigment. During or after the production of a dispersion, diverse problems hence arise such as the aggregation or settling of pigment particles in the dispersion after its production. In general, a high-molecular dispersant is formed of a pigment adsorbing segment and a solvent compatible segment. The pigment adsorbing segment adsorbs on pigment surfaces, while the solvent compatible segment is soluble in or compatible with a dispersion medium. For the uniform dispersion and stabilization of a pigment in a liquid medium, it is necessary to use, as a high-molecular dispersant, a polymer having such segments arranged with a good balance relative to the pigment and liquid medium or a block polymer or graft polymer having the respective pigments strictly controlled relative to the pigment and liquid medium.

Especially in a block polymer having a strictly controlled structure, functional sites of a pigment adsorbing segment and solvent compatible segment are clearly separated from each other so that molecules of the block polymer adsorb on each pigment particle at multiple points to achieve stronger attachment. Further, solvent compatible segments extend in a solvent, and therefore, can stably disperse pigment particles owing to a steric effect. Generally, a polymer of a low-polarity alkyl(meth)acrylate is often used as the solvent compatible segment of the high-molecular dispersant, and as its pigment adsorbing section, a polymer of a (meth)acrylate having a polar group such as an acid group, amino group or amido group is often used.

In the conventional radical polymerization of an acrylic monomer, however, only a random copolymer is available. As a termination reaction takes place in the course of such polymerization as described above, no block polymer can be obtained, and therefore, it is difficult to form the above-described respective functional sites separately.

Processes, which make use of living radical polymerization, have thus been developed for the production of block polymers. Developed as specific examples include the nitroxide mediated polymerization (NMP) process that makes use of dissociation and bonding of amine oxide radicals (Non-patent Document 1), the atom transfer radical polymerization (ATRP) process that conducts polymerization in the presence of a halogen compound as an initiating compound by using a heavy metal such as copper, ruthenium, nickel or iron and a ligand capable of forming a complex with the heavy metal (Patent Document 1, Patent Document 2, and Non-patent Document 2), the reversible addition-fragmentation chain transfer (RAFT) process that conducts polymerization by using an addition-polymerizable monomer and a radical polymerization initiator in the presence of a dithiocarboxylate ester, a xanthate compound or the like as an initiating compound (Patent Document 3), the macromolecular design via interchange of xanthate (MADIX) process (Patent Document 4), the degenerative transfer (DT) process that makes use of a heavy metal such as an organotellurium compound, organobismuth compound, organoantimony compound, antimony halide, organogermanium compound or germanium halide (Patent Document 5 and Non-patent Document 3), and so on. Extensive research and development work is underway on the living radical polymerization process.

For example, a high-molecular dispersant has been produced by the NMP process (Patent Document 6). This high-molecular dispersant uses, as a polymer adsorbing segment, a polymer block of an amino-containing monomer such as N,N-dimethylaminoethyl acrylate, and as a solvent compatible segment, a polymer block of a hydrophobic monomer such as n-butyl acrylate.

PRIOR ART DOCUMENTS

Patent Documents

Patent Document 1: JP-A-2000-500516
Patent Document 2: JP-A-2000-514479
Patent Document 3: JP-A-2000-515181
Patent Document 4: WO 1999/05099
Patent Document 5: JP-A-2007-277533
Patent Document 6: JP-A-2003-49110

Non-Patent Documents

Non-patent Document 1: Chemical Review (2001) 101, p 3661
Non-patent Document 2: Chemical Review (2001) 101, p 3689
Non-patent Document 3: Journal of American Chemical Society (2002) 124 p 2874, ibid. (2002) 124 p 13666, ibid. (2003) 125 p 8720.

DISCLOSURE OF THE INVENTION

Problem to be Solved by the Invention

However, the above-described living radical polymerization processes are accompanied by such problems as will be described next. In the NMP process, for example, tetramethylpiperidine oxide radicals are used, and in this case, an elevated polymerization temperature of 100° C. or higher is needed. To achieve a higher polymerization degree, a monomer needs to be singly subjected to polymerization without using any solvent, thereby requiring stricter polymerization conditions. Moreover, with this polymerization process, polymerization of a methacrylate monomer is not allowed to proceed in general. It may be possible to lower the polymerization temperature or to polymerize the methacrylate monomer, but in such a case, a special nitroxide compound is needed.

In the ATRP process, the use of a heavy metal is needed. After the polymerization, it is, therefore, necessary to remove the heavy metal from the resulting polymer to purify the polymer even if the heavy metal is contained in a trace amount. When the polymer is purified, the heavy metal that places a high load on the environment is also contained in effluent water and/or waste solvent, and therefore, the removal of the heavy metal from the effluent water and/or waste solvent is needed. In the ATRP process that makes use of copper, on the other hand, polymerization needs to be conducted under an inert gas. If oxygen exits in a polymerization atmosphere, cuprous copper is oxidized into cupric copper so that the catalyst is deactivated. In this case, there is a method that adds a stannic compound, ascorbic acid or the like as a reducing agent to convert the cupric copper back into the cuprous copper. Even with this method, there is a potential problem that the polymerization may terminate halfway. It is, therefore, essential to fully eliminate oxygen from the polymerization atmosphere.

In the process that conducts polymerization by forming a complex while using an amine compound as a ligand, the existence of an acidic substance in the polymerization system inhibits the formation of the complex. With this process, it is, therefore, difficult to polymerize an addition-polymerizable monomer containing an acid group. For introducing acid groups into the polymer by this process, the monomer has to be polymerized with its acid group being protected, and after the polymerization, the protecting group has to be removed. It is hence not easy to introduce acid groups into the resulting polymer block.

The process described in Patent Document 1 and Patent Document 2 uses copper. After the polymerization, copper thus needs to be eliminated to purify the resulting polymer. If an acid that inhibits the formation of a complex from copper and a ligand exists, no polymerization is allowed to proceed. Accordingly, a monomer having an acid group cannot be polymerized as it is.

Further, the RAFT process or MADIX process requires to synthesize and use a special compound such as a dithiocarboxylate ester or xanthate compound. As this process uses such a sulfur-containing compound, an unpleasant sulfur smell remains in the resulting polymer. In addition, the polymer is colored. It is, therefore, necessary to eliminate these smell and color from the polymer. The DT process makes use of a heavy metal like the ATRP process, and therefore, the heavy metal needs to be eliminated from the resulting polymer. There is, accordingly, a problem of effluent water that contains the heavy metal when it is eliminated.

Objects of the present invention are, therefore, to provide a pigment dispersion, which makes use of a high-molecular dispersant free of problems of a smell, coloration, a heavy metal and cost and is excellent in the dispersion stability of a pigment, and also a block polymer (high-molecular dispersant) for use in the pigment dispersion.

Means for Solving the Problem

The above-described object can be achieved by the present invention to be described hereinafter. Described specifically, the present invention provides a pigment dispersion comprising at least a pigment, a liquid medium and a high-molecular dispersant, wherein the high-molecular dispersant is a block polymer represented by A-B or A-B-C, in which A, B and C each represent a polymer block and the A and C blocks may be the same or different; the A and C blocks are each a polymer block formed from an ethylenically-unsaturated monomer (monomer a) which is free of an amino group or hydroxyl group; and the B block is a polymer block composed of a polymer block (D), which is formed from a monomer (monomer b) having a glycidyl group or isocyanate group, and one of an amino compound (E-1) and hydroxyl-containing compound (E-2) bonded to the polymer block (D) via the glycidyl group or isocyanate group.

In the present invention as described above, it is preferred that the block polymer represented by A-D or A-D-C, in which A, C and D each represent the corresponding polymer block and the A and C blocks may be the same or different, is a block polymer obtained by living radical polymerization of the monomer a and monomer b while using an iodine compound as an initiating compound and a phosphorus compound, nitrogen compound or oxygen compound as a catalyst; that a content of the B block in the high-molecular dispersant is from 1 to 60 wt %; that the high-molecular dispersant has a number average molecular weight of from 1,000 to 30,000; and that the high-molecular dispersant has a polydispersity index (weight average molecular weight/number average molecular weight) of from 1.05 to 1.7.

The present invention also provides a block polymer represented by A-D or A-D-C in which A, C and D each represent a polymer block and the A and C blocks may be the same or different, the A and C blocks are each a polymer block formed from an ethylenically-unsaturated monomer (monomer a) which is free of an amino group or hydroxyl group, and the D block is a polymer block formed from a monomer (monomer b) having a glycidyl group or isocyanate group.

In the present invention as described above, the block polymer may further comprise one of an amino compound (E-1) and hydroxyl-containing compound (E-2), said one compound being bonded to the polymer block (D) via the glycidyl group or isocyanate group; the amino compound (E-1) may be a polyamine selected from polyethylenimine, polyallylamine or polyvinylamine, and the block polymer is a multibranched block polymer; and the amino compound (E-1) and hydroxyl-containing compound (E-2) may be dye compounds having at least one amino group and at least one hydroxyl group, respectively.

In addition, the present invention also provides a process for producing a block polymer represented by A-D or A-D-C, in which A, C and D each represent a polymer block and the A and C blocks may be the same or different, which comprises forming by living radical polymerization the A block from an ethylenically-unsaturated monomer (monomer a) which is free of an amino group or hydroxyl group; and then, forming by living radical polymerization the D block from a monomer (monomer b) having a glycidyl group or isocyanate group; and, when the block polymer is represented by A-D-C, further forming the C block by living radical polymerization from the monomer a. According to this production process, one of an amino compound (E-1) and hydroxyl-containing compound (E-2) can be bonded further to the polymer block (D) via the glycidyl group or isocyanate group.

In the above-described production process according to the present invention, it is preferred that each living radical polymerization is a polymerization process making use of an iodine compound as an initiating compound and a phosphorus compound, nitrogen compound or oxygen compound as a catalyst; and that the phosphorus compound is a phosphorus halide, phosphite compound or phosphinate compound, the nitrogen compound is an imide compound, hydantoin compound, barbituric acid compound or cyanuric acid compound, and the oxygen compound is a phenolic compound, iodoxyphenyl compound or vitamin.

The above-described pigment dispersion according to the present invention is useful as a coloring agent, for example, in a paint, ink, coating formulation, toner, stationery or the like.

Advantageous Effects of the Invention

The process for obtaining the block polymer (high-molecular dispersant) in the present invention does not use any heavy metal, does not absolutely need the purification of the polymer, does not require the synthesis of special compounds, and can readily obtain the target product from only relatively economical materials available on the market. Further, the polymerization conditions are mild, and the polymerization can be conducted under similar conditions as the conventional radical polymerization processes, does not require any special equipment, can use conventional radical polymerization equipment, and is not affected much by water or light. Further, the monomers, solvent and the like to be used do not require purification, and monomers having various functional groups can be used to introduce them into the polymer. In addition, the polymerization degree is very high.

The block polymer useful as a high-molecular dispersant in the present invention is significantly characterized in that its polymerization is initiated from the initiating compound. By adding and polymerizing the monomer b after the polymerization and formation of the polymer block A from the monomer a, the A-D block polymer having the polymer block D, which contains glycidyl groups or isocyanate groups, can be obtained. By further polymerizing the monomer a to form the C block, the A-D-C triblock polymer can be obtained.

By further adding and reacting the compound E, which has an amino group or hydroxyl group, to the resultant polymer block D having glycidyl groups or isocyanate groups, an addition reaction readily takes place with the glycidyl groups or isocyanate groups. By this method, block polymers having various functional groups can be obtained. Further, depending on the structure of the compound E to be added, block polymers can be obtained with various physical properties, thereby making it possible to provide them as high-molecular dispersants having structures suited for the dispersion of various pigments.

MODES FOR CARRYING OUT THE INVENTION

The present invention will hereinafter be described in further detail based on preferred embodiments.

The polymerization process for use in the present invention is novel living radical polymerization. Different from the conventional processes, this living radical polymerization uses neither a metal compound nor a ligand, and further, does not use any special compound such as a nitroxide compound, dithiocarboxylate ester or xanthate compound. This living radical polymerization can be readily conducted by simply using an initiating compound and a catalyst in combination in the conventional radical polymerization.

The above-described polymerization process proceeds through a reaction mechanism represented by the following reaction formula (1), and is a reversible activation reaction of a dormant species, Polymer-X (P-X), into a propagating radical.

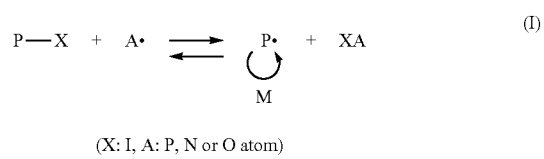

(X: I, A: P, N or O atom)

Although this polymerization mechanism may vary depending on the kind of a catalyst, the polymerization mechanism is considered to proceed as will be described next. In the reaction formula (1), P• generated from the radical initiator reacts to XA to form a catalyst A• in situ. A• acts as an activator for P-X, and owing to its catalytic effect, P-X is activated at high frequency.

Described more specifically, a radical generated from the radical initiator in the presence of the initiating compound with iodine (X) bonded thereto extracts an active hydrogen or active halogen atom from the catalyst to form a catalyst radical A•. This A• then extracts X from the initiating compound to form XA. The initiating compound, therefore, becomes a radical, to which a monomer polymerizes so that X is immediately extracted from XA to prevent any termination reaction. Under heat or the like, A• extracts X from PX to form XA and an end radical. To this end radical, the monomer reacts so that X is immediately given to the end radical to stabilize the end radical. Through repetition of these reactions, the polymerization proceeds to permit control of the molecular weight and structure. It is, however, to be noted that the above-described polymerization process may be accompanied by a bimolecular termination reaction, in which end radicals themselves of polymer molecules couple to each other, or disproportionation as a side reaction.

A description will next be made about the initiating compound for use in the present invention. Concerning the initiating compound for use in the present invention, it is preferred to use, as an initiating compound, an iodine compound represented by the following formula (1):

In this initiating compound, the iodine atom is bonded to the secondary carbon atom or tertiary carbon atom, and X, Y and Z may be the same or different and each represent a hydrogen atom, hydrocarbon group, halogen atom, cyano group, alkoxycarbonyl group, allyloxycarbonyl group, acyloxy group, allyloxy group, alkoxy group, alkylcarbonyl group or allylcarbonyl group. By the novel living radical polymerization that makes use of the monomer, radical polymerization initiator and catalyst, polymerization initiates from the initiating compound.

In the present invention, the iodine atom in the formula (1) is bonded to the secondary or tertiary carbon atom. In the case of an iodine atom bonded to a primary carbon atom, the polymerization process in the present invention can hardly cause the iodine atom to dissociate and is not suited. Therefore, at least two of X, Y and Z do not represent hydrogen atoms. Further, X, Y and Z will now be specifically exemplified, although they shall not be limited to such specific examples.

Examples of the hydrocarbon group include alkyl, alkenyl, alkynyl, aryl, and arylalkyl groups. Specific examples include alkyl groups such as methyl, ethyl, propyl, isopropyl, butyl, isobutyl, 2-methylpropyl, t-butyl, pentyl and dodecyl; alkenyl groups containing one or more double bonds, such as vinyl, allyl, 2-methylvinyl, butenyl and butadienyl; alkynyl groups containing a triple bond, such as acetylenyl and methylacetynyl; aryl groups, such as phenyl, naphthyl, methylphenyl, ethylphenyl, propylphenyl, dodecylphenyl and biphenyl, and including heterocyclic groups such as pyridinyl and imidazolinyl; arylalkyl groups such as phenylmethyl, 1-phenylethyl, 2-phenylethyl and 2-phenylpropyl; and the like.

Examples of the halogen atom include fluorine, chlorine, bromine and iodine atoms; examples of the alkoxycarbonyl group and allyloxycarbonyl group include methoxycarbonyl, ethoxycarbonyl, propylcarbonyl, cyclohexylcarbonyl, benzyloxycarbonyl, phenoxycarbonyl and naphthoxycarbonyl; examples of the acyloxy group and allyloxy group include acetoxy, ethylcarbonyloxy, cyclohexylcarbonyloxy, benzoyloxy and naphthylcarboxyloxy; examples of the alkoxy group include methoxy, ethoxy, methoxyethoxy and phenoxyethoxy; and examples of the alkylcarbonyl group and allylcarbonyl group include methylcarbonyl, ethylcarbonyl and phenylcarbonyl.

Preferred specific examples of the initiating compound include:

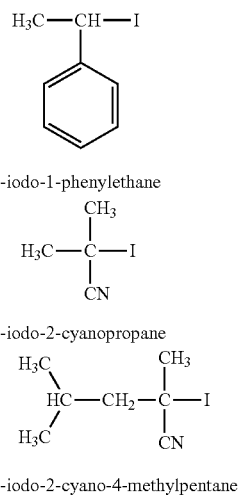

1-iodo-1-phenylethane 2-iodo-2-cyanopropane 2-iodo-2-cyano-4-methylpentane

These initiating compounds can be readily synthesized by conventionally-known processes.

A description will next be made about the catalyst for use in the living radical polymerization. Usable as the catalyst is a compound which, as shown by the above-described reaction formula, becomes a radical capable of extracting an iodine atom from the initiating compound or the terminal iodine atom from the polymer. Especially in the present invention, the catalyst is a phosphorus, nitrogen or oxygen compound having the above-mentioned property.

As phosphorus compounds, iodine-containing phosphorus halides, phosphite compounds and phosphinate compounds can be mentioned. As nitrogen compounds, imide compounds, hydantoin compounds, barbituric acid compounds and cyanuric acid compounds can be mentioned. As oxygen compounds, phenolic compounds, iodoxyphenyl compounds and vitamins can be mentioned. No particular limitation is imposed on the catalyst insofar as it is such a compound.

Specifically exemplified as phosphorus compounds, iodine-containing phosphorus halides, phosphite compounds and phosphinate compounds can be mentioned including, for example, dichloroiodophosphorus, dibromoiodophosphorus, phosphorus triiodide, dimethyl phosphite, diethyl phosphite, dibutyl phosphite, di(perfluoroethyl)phosphinate, diphenyl phosphite, dibenzyl phosphite, bis(2-ethylhexyl)phosphite, bis(2,2,2-trifluoroethyl)phosphite, diallyl phosphite, ethylene phosphite, ethylphenyl phosphinate, phenylphenyl phosphinate, ethylmethyl phosphinate, phenylmethyl phosphinate, and the like.

As nitrogen compounds, imide compounds can be mentioned including, for example, succinimide, 2,2-dimethylsuccinimide, α,α-dimethyl-β-methylsuccinimide, 3-ethyl-3-methyl-2,5-pyrrolidinedione, cis-1,2,3,6-tetrahydrophthalimide, α-methyl-α-propylsuccinimide, 5-methylhexahydroisoindol-1,3-dione, 2-phenylsuccinimide, α-methyl-α-phenylsuccinimide, 2,3-diacetoxysuccinimide, maleimide, phthalimide, 4-methylphthalimide, N-chlorophthalimide, N-bromophthalimide, N-bromophthalimide, 4-nitrophthalimide, 2,3-naphthalenecarboximide, pyromellitic diimide, 5-bromoisoindol-1,3-dione, N-chlorosuccinimide, N-bromosuccinimide, N-iodosuccinimide, and the like. Hydantoin compounds can be mentioned including, hydantoin, 1-methylhydantoin, 5,5-dimethylhydantoin, 5-phenylhydantoin, 1,3-diiodo-5,5-dimethylhydantoin, and the like. Barbituric acid compounds can be mentioned including, for example, barbituric acid, 5-methylbarbituric acid, 5,5-diethylbarbituric acid, 5-isopropylbarbituric acid, 5,5-dibutylbarbituric acid, thiobarbituric acid, and the like. Cyanuric acid compounds can be mentioned including, for example, cyanuric acid, N-methylcyanuric acid, triiodocyanuric acid, and the like.

As oxygen compounds, phenolic compounds each having a phenolic hydroxyl group which is a hydroxyl group bonded to an aromatic ring, iodoxyphenyl compounds as iodides of such phenolic hydroxyl groups, and vitamins can be mentioned. Examples of the phenolic compounds include phenol, hydroquinone, 4-methoxyphenol, 4-t-butylphenol, 4-t-butyl-2-methylphenol, 2-t-butyl-4-methylphenol, catechol, resorcinol, 2,6-di-t-butyl-4-methylphenol, 2,6-dimethylphenol, 2,4,6-trimethylphenol, 2,6-di(t-butyl)-4-methoxyphenol, polymer obtained by polymerizing 4-hydroxystyrene, and hydroxyphenyl-carrying microparticles of the polymer, monomers having a phenolic hydroxyl group such as 3,5-di-t-butyl-4-hydroxyphenylethylmethacrylate, and the like. As these compounds are incorporated as polymerization inhibitors in ethylenically-unsaturated monomers, catalytic effects can also be exhibited by using commercially-available, ethylenically-unsaturated monomers as they are without purification. The iodoxyphenyl compounds include thymol iodide and the like, and the vitamins include vitamin C, vitamin E and the like. One or more of these catalysts can be used, and the catalyst is not limited to these specific examples.

The high-molecular dispersant for use in the present invention can be obtained by block polymerization of the monomer a and the monomer b, and is represented by A-B or A-B-C in which A, B and C each represent a polymer block and the A and C blocks may be the same or different.

The B block is a polymer block obtained by reacting, to a monomer b having a glycidyl group or isocyanate group, an amino compound (E-1) when the monomer b has the glycidyl group, or a compound (E-2) having a primary amino, secondary amino or hydroxyl group when the monomer b has the isocyanate group. This B block, therefore, contains functional groups such as amino groups or polycyclic groups derived from the reacted compound E (E-1 or E-2), and these functional groups significantly adsorb on a pigment. The B block hence acts as a pigment adsorbing segment.

The A block or C block is formed from a monomer a which reacts to neither a glycidyl group nor an isocyanate group. This polymer block is a solvent compatible block soluble in a liquid medium.

The high-molecular dispersant (block polymer) for use in the present invention disperses the pigment in the liquid medium such that the B block adsorbs on the pigment and the A block and C block are dissolved in the solvent. In particular, the compound E to be reacted to the glycidyl groups or isocyanate groups of the polymer block D can be chosen and used as desired in the present invention. It is, therefore, a significant characteristic that various functional groups can be introduced into the B block to obtain high-molecular dispersants with functional groups chosen for various pigments such that the functional groups are suited for surfaces of the respective pigments.

A description will first be made about the B block. The B block can be obtained by first obtaining the polymer block D from the constituent monomer having at least the glycidyl group or isocyanate group, and then adding and reacting the compound E capable of reacting with glycidyl groups or isocyanate groups of the polymer block D.

No particular limitation is imposed on the monomer b having the glycidyl group or isocyanate group. Examples of the monomer having the glycidyl group include (meth)acrylates such as glycidyl(meth)acrylate, 2-methylglycidyl(meth)acrylate, 3,4-epoxycyclohexyl(meth)acrylate, (meth)acryloyloxyethyl glycidyl ether and (meth)acryloyloxyethoxyethyl glycidyl ether; and vinyl monomers such as glycidyl vinyl ether and allyl glycidyl ether.

Examples of the monomer b having the isocyanate group include (meth)acryloyloxyethyl isocyanate and 2-(2-isocyanatoethoxy)ethyl (meth)acrylate; monomers obtained by protecting the isocyanate groups of such isocyanate compounds with ε-caprolactone, methyl ethyl ketone oxime, pyrazole or the like; dimethyl-isocyanatomethyl-isopropenyl benzene, 4-vinylphenyl isocyanate, 2,2-dimethyl-2-isocyanatoethyl vinyl ether, and the like; and ethylenically-unsaturated monomers formed of diisocyanates, such as toluene diisocyanate and isophorone diisocyanate, and a hydroxyl group, respectively, for example, a monomer obtained by reacting hydroxyethyl(meth)acrylate to only one isocyanate group in such a diisocyanate.

As the constituent monomer of the D block, the above-described monomer b may be used singly. As an alternative, a monomer c that reacts with neither a glycidyl group nor an isocyanate group may also be used as an additional constituent monomer. No particular limitation is imposed on the proportion of the monomer c. Preferably, however, the proportion of the monomer c can be 50 mole % or less of the sum of the monomer b and monomer c. As the monomer c, a monomer having a functional group which reacts with a glycidyl group cannot be used when the monomer b has a glycidyl group. As examples of a functional group that reacts with a glycidyl group relatively easily, carboxyl, amino, phenolic hydroxyl, and the like can be mentioned.

As the monomer c, any other monomer having a functional group which reacts with an isocyanate group cannot be used when the monomer b has an isocyanate group. As examples of a functional group that reacts with an isocyanate group easily, hydroxyl, primary amino, secondary amino, and the like can be mentioned.

Examples of the monomer c include, as vinyl monomers, styrene, vinyltoluene, chloromethylstyrene, vinylnaphthalene, vinylbiphenyl, vinylethylbenzene, vinyldimethylbenzene, α-methylstyrene, isoprene, butene, butadiene, 1-hexene, cyclohexene, cyclodecene, acrylonitrile, methacrylonitrile, vinyl acetate, vinyl propionate, phenylmaleimide, cyclohexylmaleimide, and the like.

Examples of an aliphatic, alicyclic or aromatic alkyl monomer c include (meth)acrylates such as methyl (meth)acrylate, ethyl (meth)acrylate, propyl(meth)acrylate, isopropyl(meth)acrylate, butyl (meth)acrylate, 2-methylpropane(meth)acrylate, t-butyl (meth)acrylate, pentyl(meth)acrylate, hexyl (meth)acrylate, octyl(meth)acrylate, 2-ethylhexyl(meth)acrylate, nonyl(meth)acrylate, decyl(meth)acrylate, isodecyl (meth)acrylate, lauryl(meth)acrylate, tetradecyl(meth)acrylate, octadecyl(meth)acrylate, behenyl(meth)acrylate, isostearyl(meth)acrylate, cyclohexyl(meth)acrylate, t-butylcyclohexylmethyl(meth)acrylate, t-butylcyclohexylmethyl (meth)acrylate, isoboronyl(meth)acrylate, trimethylcyclohexyl(meth)acrylate, cyclodecyl(meth)acrylate, cyclodecylmethyl(meth)acrylate, tricyclodecyl(meth)acrylate, tricyclohexyloxyethyl(meth)acrylate, benzyl (meth)acrylate, phenyl(meth)acrylate, naphthyl(meth)acrylate, allyl (meth)acrylate, and the like.

When the monomer b contains a glycidyl group, a monomer c having one or more hydroxyl groups may be used. Illustrative are 2-hydroxyethyl(meth)acrylate, 2-hydroxypropyl(meth)acrylate, 3-hydroxypropyl(meth)acrylate, 4-hydroxybutyl(meth)acrylate, 6-hydroxyhexyl(meth)acrylate, 5-hydroxy-3-methylpentyl(meth)acrylate, neopentyl glycol mono(meth)acrylate, cyclohexanedimethanol mono (meth)acrylate, cyclohexanediol mono(meth)acrylate, and the like. These monomers c cannot be used when the monomer b has an isocyanate group, because they react with the monomer b.

Examples of a glycol monomer c include, when the monomer b contains a glycidyl group, polyalkylene glycol mono (meth)acrylates such as poly(n≥2)ethylene glycol mono (meth)acrylate, poly(n≥2)propylene glycol mono(meth)acrylate, poly(n≥2)tetramethylene glycol mono(meth)acrylate, the mono(meth)acrylate of a mono- or poly(n≥2) ethylene glycol-mono- or poly(n≥2)propylene glycol random copolymer, and the mono(meth)acrylate of a polyalkylene glycol, such as the mono(meth)acrylate of a mono- or poly(n≥2)ethylene glycol-mono- or poly(n≥2)propylene glycol block copolymer. These monomers c cannot be used as the monomer c when the monomer b has an isocyanate group, because they react with the monomer b.

Also included are (poly)ethylene glycol monomethyl ether (meth)acrylate, (poly))ethylene glycol monooctyl ether (meth)acrylate, (poly)ethylene glycol monolauryl ether (meth)acrylate, (poly)ethylene glycol monostearyl ether (meth)acrylate, (poly)ethylene glycol monooleyl ether(meth)acrylate, (poly)ethylene glycol monostearate ester(meth)acrylate, (poly)ethylene glycol monononylphenyl ether (meth)acrylate, (poly)propylene glycol monomethyl ether (meth)acrylate, (poly)propylene glycol monoethyl ether (meth)acrylate, (poly)propylene glycol monooctyl ether (meth)acrylate, (poly)propylene glycol monolauryl ether (meth)acrylate, (poly))ethylene glycol (poly) propylene glycol monomethyl ether(meth)acrylate, and the like.

When the monomer b contains an isocyanate group, a monomer c having an acid group, which is low in reactivity to the isocyanate group, can be used. The acid group can be a sulfonic group or phosphoric group. As monomers containing a sulfonic group, for example, styrenesulfonic acid, dimethylpropylsulfonic acid (meth)acrylamide, ethylsulfonate (meth)acrylate, ethylsulfonate(meth)acrylamide, vinyl sulfonic acid, and the like can be mentioned. As monomers containing a phosphoric group, methacryloyloxyethyl phosphates and the like can be mentioned. One or more of these monomers can be used. No particular limitation is imposed on the acid value of a block polymer, which is governed by such acid groups.

Citing other monomers c, examples include halogen-containing (meth)acrylates such as tetrahydrofurfuryl(meth)acrylate, oxetanylmethyl(meth)acrylate, (meth)acrylamide, N,N-dimethyl(meth)acrylamide, N,N-diethyl(meth)acrylamide, N-butoxymethyl(meth)acrylamide, octafluorooctyl (meth)acrylate, and tetrafluoroethyl(meth)acrylate; UV-absorbing monomers such as 2-(4-benzoxy-3-hydroxyphenoxy)ethyl (meth)acrylate and 2-(2'-hydroxy-5-(meth)acryloyloxyethylphenyl)-2H-benzotriazole; silicon-containing monomers having a trimethoxysilyl group or dimethylsilicone chain; macromonomers obtained by introducing an unsaturated bond into one ends of oligomers obtained by polymerizing these monomers; macromonomers obtained by using a cobalt compound such as cobalt porphyrin as a chain transfer agent and having a terminal unsaturated bond; and the like.

For the formation of the B block, a monomer having two or more addition-polymerizable groups may also be used. When a bifunctional or higher functionality monomer is used for the formation of the B block, the bonding between two functional groups themselves takes place. As a result, the B block is polymerized in a branched form, thereby providing a multi-branched, star block polymer in which A blocks are grafted. No particular limitation is imposed on the bifunctional or higher functional monomer to be used, and examples include divinylbenzene; the di(meth)) acrylates of diols such as ethylene glycol, propylene glycol, polyethylene glycol, polypropylene glycol and cyclohexanedimethanol; polyester polyol (meth)acrylates; the (meth)acrylates of polyhydroxy compounds such as trimethylolpropane and pentaerythritol; products obtained by reacting acid groups of monomers having the acid groups with glycidyl groups of monomers having the glycidyl groups; and products obtained by reacting hydroxyl-containing monomers with isocyanato-containing monomers; and the like.

A description will next be made about the compound E that gives functional groups to the D block having glycidyl groups or isocyanate groups. When the D block has glycidyl groups, an amino compound (E-1) having good reactively can be mentioned. Amino groups react to glycidyl groups, and the glycidyl groups undergo ring opening. Into the D block, hydroxyl groups can be introduced together with secondary amino groups when E-1 is a primary amino compound, tertiary amino groups when E-1 is a secondary amino compound, or quaternary ammonium salts when E-1 is a tertiary amino compound. As a result, the D block is converted into a polymer block that has the amino groups and shows basic properties.

As various amino compounds (E-1) can be used upon formation of the high-molecular dispersant for use in the present invention, it is a significant characteristic that various structures can be introduced into the high-molecular dispersant. When diphenylamine is reacted, for example, aromatic rings and amino groups can be concurrently introduced into the B block.

No limitation is imposed on the amino compound (E-1), and conventionally-known amines can be used. Exemplifying as primary amines, methylamine, ethylamine, n-propylamine, n-butylamine, n-pentylamine, n-hexylamine, cyclohexylamine, n-octylamine, laurylamine, allylamine, ethanolamine, 3-aminopropanol, benzylamine, 1-phenylethylamine, 2-phenylethylamine, aniline, ethylenediamine, propane-1,3-diamine, 1,2-diaminopropane, 4-amino-9H-fluorene, 1-aminoanthracene, 1-aminopyrene, 1-aminoanthraquinone, and the like can be mentioned. In the case of such a primary amine, the resulting functional groups are secondary amino groups, and these secondary amino groups react with the reactive groups in the D block of another molecule so that the B block can be provided with a crosslinked structure to form a star polymer or multi-branched polymer of higher-order structure.

As secondary amines, illustrative are dimethylamine, methylethylamine, diethylamine, methyl-n-propylamine, di-n-propylamine, methyl-n-butylamine, ethyl-n-butylamine, diisopropylamine, di-n-butylamine, diisobutylamine, di-2-ethylhexylamine, di-n-octylamine, dilaurylamine, dicyclohexylamine, diallylamine, dibenzylamine, dinaphthylmethylamine, diethanolamine, di-n-propanolamine, diisopropanolamine, diphenylamine, dinaphthylamine, pyrrole, pyrrolidine, piperazine, morpholine, indole, indoline, carbazole, 2-methylcarbazole, 3,4-benzcarbazole, N-methylbenzylamine, N-dodecylbenzylamine, N-benzylaniline, and the like.

As tertiary amines, illustrative are trimethylamine, triethylamine, tri-n-propylamine, tri-n-butylamine, trihexylamine, tri-n-octylamine, triallylamine, tribenzylamine, triethanolamine, triisopropanolamine, N,N-dimethyl-n-butylamine, N,N-dimethyl-n-dodecylamine, N,N-dimethylbenzylamine, N,N-dimethylaniline, N,N-dimethylaminoethylamine, N,N-diethylaminoethylamine, N,N-dimethyl-1,3-propanediamine, N,N-diethyl-1,3-propanediamine, N,N-dibutyl-1,3-propanediamine, 2-aminoethylpiperidine, 2-aminopropylpiperidine, 2-aminoethylmorpholine, 2-aminopropylmorpholine, tetramethylethylenediamine, pentamethyldiethylenetriamine, and the like.

As other amines, illustrative are ammonia, imidazole, benzoimidazole, pyrazole, 4-aminopyridine, 2-aminopyrimidine, 2-amino-1H-imidazole, 1H-imidazole-4-ethanamine, 2-amino-1H-benzimidazole, 3-amino-9-ethyl-9H-carbazole, 3-(aminomethyl)-9-methyl-9H-carbazole, 4-(9H-carbazol-9-yl)-4'-aminobenzophenone, 7-amino-4-methylcoumarin, 7-amino-3-phenylcoumarin, 4-aminobiphenyl, 8-aminoquinoline, 9-aminoacridine, and the like. One of more of these amines can be used.

In the present invention, a compound (E-1) having two or more amino groups may also be used. As described above, the B block can be provided with a crosslinked structure to form a star polymer or multi-branched polymer. Examples of the compound having two or more amino groups include diamines of low molecular weight, such as ethylenediamine, hexamethylenediamine, xylylenediamine and diethylenetriamine; triamines; and the like. In particular, the use of a polyamine, a polymer amine having several amino groups, in the present invention makes it possible to obtain a multi-branched block polymer. Segments of this polyamine undergo surface adsorption on a pigment, and can highly disperse the pigment. Therefore, such a polyamine is useful. As these polyamines, polyethylenimine, polyallylamine and polyvinylamine can be mentioned. No particular limitation is imposed on the polymerization degree of the polyamine, and its molecular weight may be from 200 to 10,000. In polyethylenimine, primary, secondary and tertiary amino groups are included as the kinds of amino groups in its structure. When such polyethylenimine is reacted with the D block having glycidyl groups, the glycidyl groups can react with the tertiary amino groups out of the above-mentioned amino groups to form a quaternary ammonium salt.

When the B block has isocyanate groups, a compound (E-2) having a single primary amino group, secondary amino group or hydroxyl group, which has good reactivity to an isocyanate group, is reacted. A urethane bond is formed through a reaction between an isocyanate group and a hydroxyl group, and a urea bond is formed through a reaction between an isocyanate group and a primary or secondary amino group. By introducing into the B block amino groups which are basic functional groups, the B block can be converted into the pigment adsorbing segment of the high-molecular dispersant. In this case, used as E-2 is a compound having a single primary amino group, secondary amino group or hydroxyl group and one or more tertiary amino groups. The compound having a single primary amino group or secondary amino group and one or more tertiary amino groups is exemplified above as E-1. From the above-exemplified compounds, one or more compounds can be chosen and use.

In particular, the above-described polyamines can be used as E-1 to be reacted with isocyanate groups in the present invention. Concerning the molar ratio of isocyanate groups to amino groups to be reacted, excessive use of amino groups can form a multi-branched block polymer having basic properties at the B block. No limitation is imposed on the polymerization degree of the polyamine. Further, no limitation is imposed on the ratio of the isocyanate groups to the amino groups, and the amino groups can be used in an equimolar or greater amount.

Examples of the compound having a single hydroxyl group and one or more tertiary amino groups include, but are not specifically limited to, dimethylaminoethanol, diethylaminoethanol, dimethylaminopropanol, dimethylaminoethylmethylaminoethanol, N-methyl-3-piperidinol, N-ethyl-3-piperidinol, N-benzyl-3-piperidinol, N-bezyl-3-pyrrolidinol, N-methyl-2-piperidineethanol, 1,2,2,6,6-tetramethylpiperidinol, N-methyl-4-piperidinol, 3-hydroxypyridine, 3-hydroxy-6-methylpyridine, 5-methyl-2-pyridineethanol, and the like. One or more of these compounds can be used.

Further, the B block can also be provided with pigment adsorbing ability by introducing a dye compound, which is a polycyclic compound, into the D-block having glycidyl groups or isocyanate groups in addition to the introduction of amino groups as basic functional groups. Usable as the dye compound is, for example, a dye compound having a pigment analogous structure or the skeleton of a pigment raw material and containing one or more amino groups and one or more hydroxyl groups. As a dye, for example, a conventionally-known dye can be used. The structure of the dye has the skeleton of an azo, cyanine, phthalocyanine, perylene, perinone, diketopyrrolopyrrole, quinacridone, isoindolinone, isoindoline, azomethine, dioxazine, quinophthalone, anthraquinone, indigo, azo-metal complex, quinoline, diphenylmethane, triphenylmethane, xanthene, Lumogen, coumarin or fluorescein skeleton dye employed as a so-called pigment or dye, or the skeleton of a fluorescent dye; and contains one or more amino groups and one or more hydroxyl groups on the dye skeleton.

In addition, as fluorescein dyes,

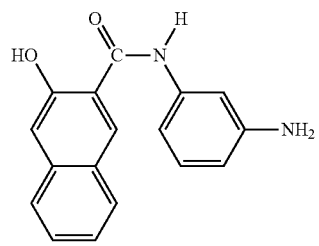

and the like can be mentioned, and as pyrene skeletons,

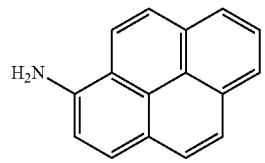 [SMILES: Nc1ccc2ccc3cccc4ccc1c2c34]

and the like can be mentioned.

Also usable area those obtained by introducing one or more amino groups and one or more hydroxyl groups into the structures of raw materials that form these dyes. For example, as azo couplers, and the like can be mentioned. No particular limitation is imposed on these dyes, and one or more of them can be used.

In the case of a dye compound with an amino group and hydroxyl group introduced therein, the dye compound may be reacted, as it is, to the D block such that these groups can be introduced as functional groups into the B block to use them as pigment adsorbing groups. As an alternative, a dye raw material may be reacted into a dye compound with an amino group and hydroxyl group introduced therein, and the dye compound may then be reacted to the D block such that these groups can be introduced as functional groups into the B block. By synthesizing, as a portion of a raw material for a pigment, a block polymer having such a dye compound bonded thereto, the pigment can be obtained with the block polymer contained therein.

Further, by reacting the block polymer according to the present invention, which contains the D block having glycidyl groups or isocyanate groups, to pigment particles having amino groups and hydroxyl groups on their surfaces, the high-molecular dispersant according to the present invention can be bound to the surfaces of the pigment particles. Described specifically, the glycidyl groups or isocyanate groups of the D block may be reacted to the amino groups or hydroxyl groups bonded to the pigment skeleton upon conducting pigmentation to adjust the crystal form, to make uniform the particle size and to achieve microparticulation; or amino groups or hydroxyl groups may be introduced onto the pigment surfaces by plasma exposure, ammonia plasma exposure or the like, and their active hydrogen atoms may then be reacted with the glycidyl groups or epoxy groups of the D block polymer to bond them together.

Describing next about the monomer a that makes up both the A block and the C block, the monomer a comprises one or more monomers, which do not react with the glycidyl groups or isocyanate groups of the above-described B block, and further, which have neither glycidyl groups nor isocyanate groups. Namely, no particular limitation is imposed on the monomer a insofar as it does not react with the above-described glycidyl groups or isocyanate groups. Further, the A block and C block may each take the structure of a homopolymer obtained by polymerizing a single monomer a, a random polymer obtained by copolymerizing two or more monomers a, a gradient polymer obtained by copolymerizing two or more monomers a and having a gradient in the array of monomer units, or a like polymer. It is to be noted that the monomer a and the monomer c may be the same or different.

Next, as the radical initiator for use in the polymerization according to the present invention, conventionally-known one is usable. No particular limitation is imposed on it, and commonly-employed organic peroxides and azo compounds can be used. Specific examples include benzoyl peroxide, dicumyl peroxide, diisopropyl peroxide, di-t-butyl peroxide, t-butyl peroxybenzoate, t-hexyl peroxybenzoate, t-butyl peroxy-2-ethylhexanoate, t-hexyl peroxy-2-ethylhexanoate, 1,1-bis(t-butylperoxy)-3,3,5-trimethylcyclohexane, 2,5-dimethyl-2,5-bis(t-butylperoxy)hexyl-3,3-isopropylhydroperoxide, t-butyl hydroperoxide, dicumyl hydroperoxide, acetyl peroxide, bis(4-t-butylcyclohexyl) peroxydicarbonate, isobutyl peroxide, 3,3,5-trimethylhexanoyl peroxide, lauryl peroxide, 1,1-bis(t-butylperoxy)-3,3,5-trimethylcyclohexane, 1,1-bis(t-hexylperoxy)-3,3,5-trimethylcyclohexane, 2,2'-azobis(isobutyronitrile), 2,2'-azobis(2,4-dimethylvaleronitrile), 2,2'-azobis(4-methoxy-2,4-dimethylvaleronitrile), dimethyl 2,2'-azobis(isobutyrate), and the like.

As described above, the A-D or A-D-C block polymer can be obtained by using the initiating compound having the formula (1) as an initiating compound, the monomer a and monomer b, and if desired, the monomer c, the radical initiating agent and the catalyst, and polymerizing the monomer a and monomer b. By further addition-reacting the compound E to the block polymer, the A-B or A-B-C block polymer, that is, the high-molecular dispersant according to the present invention can be obtained. The polymerization for use in the present invention may be bulk polymerization, but solution polymerization is preferred. The solid content of the polymerization mixture is not particularly limited, but may be from 5 to 80 wt %, with from 10 to 60 wt % being preferred.

As examples of a polymerization solvent, solvents that react with neither a glycidyl group nor an isocyanate group can be selectively used depending on each polymerization reaction. Usable solvents include, but are not particularly limited to, a variety of solvents, for example, hydrocarbon solvents such as hexane, octane, decane, isodecane, cyclohexane, methylcyclohexane, toluene, xylene, ethylbenzene, and cumene; when the monomer for the D block has a glycidyl group, alcohol solvents such as methanol, ethanol, propanol, isopropanol, butanol, isobutanol, hexanol, benzyl alcohol and cyclohexanol; when the monomer for the D block has a glycidyl group, hydroxyl-containing glycol ethers such as ethylene glycol, diethylene glycol, propylene glycol, dipropylene glycol, methyl cellosolve, ethyl cellosolve, butyl cellosolve, propylene glycol monomethyl ether, propylene glycol monoethyl ether, propylene glycol propyl ether, butyl carbitol, butyl triethylene glycol, and methyl dipropylene glycol; glycol solvents such as diglyme, triglyme, methyl cellosolve acetate, propylene glycol monomethyl ether acetate, dipropylene glycol butyl ether acetate, and diethylene glycol monobutyl ether acetate; ether solvents such as diethyl ether, dimethyl ether, dipropyl ether, methyl cyclopropyl ether, tetrahydrofuran, dioxane, and anisole; ketone solvents such as dimethyl ketone, diethyl ketone, ethyl methyl ketone, isobutyl methyl ketone, cyclohexanone, isophorone, and acetophenone; ester solvents such as methyl acetate, ethyl acetate, butyl acetate, propyl acetate, methyl butyrate, ethyl butyrate, caprolactone, methyl lactate, and ethyl lactate; halogenated solvents such as chloroform, dichloromethane, dichloroethane, and o-dichlorobenzene; amide solvents such as formamide, N,N-dimethylformamide, N,N-dimethylacetamide, 2-pyrrolidone, N-methyl-2-pyrrolidone, and ε-caprolactam; and dimethyl sulfoxide, sulfolane, tetramethylurea, ethylene carbonate, propylene carbonate, dimethyl carbonate, diethyl carbonate, nitromethane, acetonitrile, nitrobenzene, dioctyl phthalate, and the like.

In the polymerization according to the present invention, the molecular weight of the resulting polymer can be controlled depending on the amount of the initiating compound. By setting the number of moles of a monomer relative to the number of moles of the initiating compound, the resulting polymer can be controlled to a desired molecular weight or the magnitude of its molecular weight can be controlled. No particular limitation is imposed on the molar ratio of the initiating compound to the monomer. When 500 moles of a monomer having a molecular weight of 100 are used and polymerized by using 1 mole of the initiating compound, for example, the molecular weight is calculated to be $1 \times 100 \times 500 = 50,000$. Namely, a preset molecular weight can be calculated by:

$$\text{Initiating compound 1 mole} \times \text{the molecular weight of a monomer} \times \text{the molar ratio of the monomer to the initiating compound}$$

In some instances, however, the polymerization process in the present invention may be accompanied by a side reaction that is a coupling reaction of polymer radicals themselves, so that the actual molecular weight may not be controlled to the above-described calculated molecular weight but may become greater. Or, the polymerization may terminate so that the actual molecular weight may become smaller. No problem, however, arises at all even if the polymerization is accompanied by such a side reaction, because it is a significant point in the present invention that the high-molecular dispersant is a block polymer.

Next, the radical initiator can be used as much as preferably from 0.001 to 0.1 molar times, more preferably from 0.002 to 0.05 molar times, still more preferably from 0.005 to 0.01 molar times the number of moles of the monomer, because an unduly small use amount of the radical initiator does not allow the polymerization to proceed sufficiently while an excessively large use amount of the radical initiator has a potential problem that polymerization irrelevant to the living radical polymerization may take place and the resulting block polymer may have a molecular weight lower than the calculated molecular weight.

The amount of the catalyst may preferably be smaller than the number of moles of the radical initiator. If the number of moles of the catalyst is excessively large, the polymerization is controlled so much that it does not proceed. If the number of moles of the catalyst is unduly small, on the other hand, the polymerization cannot be controlled sufficiently, a termination reaction takes place, and therefore, a polymer having a broad molecular weight distribution is formed. The amounts of the radical initiator and catalyst can be determined as desired within the above-described ranges, respectively, and are not specifically limited.

The polymerization temperature in the present invention is not particularly limited, and may be preferably from 0° C. to 150° C., more preferably from 30° C. to 120° C. The polymerization temperature should be adjusted depending on the half-life of each radical initiator. Although it is preferred to continue the polymerization until the monomer is used up, the polymerization time is not particularly limited and may be, for example, from 0.5 hour to 48 hours, and as a practical time, preferably from 1 hour to 24 hours, more preferably from 2 hours to 12 hours.

The polymerization atmosphere is not particularly limited, and the polymerization may be conducted in the air. In other words, oxygen may exist in a usual range in the polymerization system, or if necessary, the polymerization may be conducted under a nitrogen atmosphere to eliminate oxygen. As the various materials to be used, commercial products can be used as they are although impurities may be removed by distillation or with activated carbon, alumina or the like. Further, the polymerization may be conducted under shading, but no problem arises even when the polymerization is conducted in a transparent vessel like a glass vessel.

The molecular weight of the block polymer (high-molecular dispersant) according to the present invention may be preferably from 1,000 to 30,000, more preferably from 5,000 to 20,000 as a styrene-equivalent number average molecular weight (hereinafter abbreviated as "Mn") measured by gel permeation chromatography (hereinafter abbreviated as "GPC"). Further, the polydispersity index (PDI) (hereinafter abbreviated as "PDI"), which is the ratio of the weight average molecular weight to Mn, can be controlled to from 1.05 to 2 by the process of the present invention. Preferably, however, PDI may be from 1.05 to 1.7.

As a process for obtaining the A-B or A-B-C block polymer according to the present invention, the A-B block polymer can be obtained by first polymerizing the monomer a or monomer b in accordance with the above-described living radical polymerization, then polymerizing the monomer b when the A block has been polymerized earlier or polymerizing the monomer a when the monomer b has been polymerized earlier, thereby forming the A-D copolymer, and then reacting the compound E to the A-D copolymer. In the case of A-B-C, the A-B-C block polymer can be obtained as a target product by obtaining A-D in a similar manner as in A-B, adding and polymerizing the monomer a to form A-D-C, and then adding the compound E.

A description will now be made about the preferred ratio of A to B or A to B to C in the block polymer. In the case of the A-B block polymer, the A block may range from 40 to 99 wt % while the B block may range from 1 to 60 wt %. In the case of the A-B-C block polymer, on the other hand, the proportions of the A and C polymer blocks may be the same or different, and the A and C blocks (the total weight proportion of these two blocks) may range from 40 to 99 wt % while the B block may range form 1 to 60 wt %. Particularly important in the present invention is the effects of the B block on the pigment, so that the content of the B block in the block polymer may range from 1 to 60 wt %. A content of the B block lower than 1 wt % results in poor adsorption of the B block onto the pigment, while a content of the B block higher than 60 wt % results in adsorption of the B block between pigment particles, and moreover, the content of the A block as a solvent-soluble segment is so low that the resulting pigment dispersion is provided with undesired storage stability and viscosity.

Turning next to the amount of the compound E to be added after the formation of the D block, it may be preferably from 1 to 120%, more preferably from 25 to 100% in terms of its molar ratio to the glycidyl or isocyanate groups. A molar ratio of smaller than 1% provides the resulting block polymer with a smaller number of pigment absorbing groups, so that no sufficient pigment dispersing ability is exhibited. Preferably, glycidyl groups or isocyanate groups do not remain as functional groups in the B block. However, no problem arises at all even if such groups remain.

The temperature at which the compound E is reacted to the glycidyl groups or isocyanate groups in the D block is not particularly limited, and may be preferably from 0° C. to 150° C., more preferably from 20° C. to 120° C. Although it is preferred to continue the reaction until the unreacted compound E becomes no longer in existence, the reaction time is not particularly limited and may be, for example, from 0.5 hour to 24 hours, and as a practical time, preferably from 1 hour to 24 hours, more preferably from 2 hours to 12 hours.

If the reaction between the glycidyl groups and amino groups or the reaction between the isocyanate groups and hydroxyl groups is slow in the above-described reaction, a conventionally-known catalyst may be added. Examples of the catalyst may include, but are not particularly limited to, quaternary ammonium salts such as benzyltriethylammonium chloride and benzyltriethylammoniumbromide, tetraethylphosphonium bromide, dibutyl tin dilaurate, tin dilaurate, diazabicyclooctane, and the like. In the manner as described above, the A-B or A-B-C block polymer having the pigment-adsorbing B block can be obtained.

A description will next be made about the pigment dispersion according to the present invention. The pigment dispersion according to the present invention contains the above-described high-molecular dispersant, pigment and liquid medium, and further, various additives as needed. The high-molecular dispersant according to the present invention is useful as a high-molecular dispersant for pigment dispersions such as paints, inks, stationery, inkjet inks, color filters and the like. In addition, the block polymer according to the present invention can also be used as a binder for paints, inks, coating formulations, stationery, textile printing agents, inkjet inks, and color filters. In the case of the block polymer according to the present invention which has been reacted to a so-called dye or pigment as needed, the block polymer can be used, as it is, as a dye for the above-described applications.

The amount of the high-molecular dispersant (block polymer) for these applications can be preferably from 1 to 200%, more preferably from 5 to 100% by weight based on the pigment. The mixing and dispersing method of the pigment is conventionally known, and is not particularly limited. The dispersion can also be conducted by using one or more of conventionally-known dispersants in combination. The pigment concentration in the pigment dispersion varies depending on the kind of the pigment, but may be from 0.5 to 70 wt %, preferably from 0.5 to 60 wt % in the dispersion.

As the pigment for use in the present invention, no limitation is imposed, and a conventionally-known pigment can be used. Illustrative inorganic pigments include titanium dioxide, iron oxide, antimony pentoxide, zinc oxide, silica, cadmium oxide, calcium carbonate, barium carbonate, barium sulfate, clay, talc, chrome yellow, carbon black and the like. Illustrative organic pigments include soluble azo pigments, insoluble azo pigments, phthalocyanine pigments, quinacridone pigments, isoindolinone pigments, isoindoline pigments, perylene pigments, perinone pigments, dioxazine pigments, anthraquinone pigments, dianthraquinonyl pigments, anthrapyrimidine pigments, anthanthrone pigments, indanthrone pigments, flavanthrone pigments, pyranthrone pigments, diketopyrrolopyrrole pigments, and the like.

As the liquid medium used in the pigment dispersion according to the present invention, water or one or more of the above-described organic solvents can be used.

Exemplifying the dispersion method of the pigment, dispersion processing is performed in a dispersing machine by using the high-molecular dispersant according to the present invention and the pigment, and if necessary, adding various additives. The pigment and the high-molecular dispersant are mixed, followed by provisional mixing as needed. The resulting mixture is then dispersed in the dispersing machine to obtain a pigment dispersion. No particular limitation is imposed on the dispersing machine which can be used in the present invention, and a conventionally-known dispersing machine can be used. For example, a kneader, an attritor, a ball mill, a sand mill or horizontal medium-containing dispersing machine making use of a glass or zircon medium, a colloid mill, or the like can be used.

In the pigment dispersion, various additions can be incorporated in addition to the pigment dispersant and liquid medium. Usable examples include durability improvers such as ultraviolet absorbers and antioxidants, anti-settling agents, repellents or repellency enhancers, fragrances, antibacterial agents, antimolds agents, plasticizers, antidrying agents, and the like. Further, other dispersants, dispersion aids, pigment treatment agents, so-called dyes and the like can be also incorporated as needed.

The thus-obtained pigment dispersion may be used as it is, but from the standpoint of providing the pigment dispersion with higher reliability, it is preferred to remove, by a centrifuge, ultracentrifuge or filter, coarse particles which may exist slightly. The viscosity of the resulting pigment dispersion may be set as desired depending on its application.

By using the high-molecular dispersant as described above, the pigment dispersion can be obtained. This pigment dispersion can be used as a coloring agent for conventionally-known paints, inks, coating formulations and stationery. Specifically, the pigment dispersion can be used as a coloring agent for water-based paints, oil-based paints, gravure inks, water-based flexographic inks, inkjet inks, stationery inks, writing instrument inks, coating formulations, colors for color filters, wet toners, and the like. The amount of the pigment dispersion to be added also varies depending on the pigment concentration, and therefore, cannot be specified. The pigment dispersion can be used as much as needed according to desired color concentrations in the respective applications.

The block polymer according to the present invention can also be used as a binder component for paints, offset inks, gravure inks, inkjet inks, stationery colors and textile printing agents. The block polymer can be used in a similar manner as in the conventionally-known manner, and is not particularly limited.

As various functional groups can be introduced in the block polymer according to the present invention, a strong coating of the block polymer can be obtained by conducting a curing reaction while using such functional groups. When hydroxyl groups exist in the block polymer, for example, an isocyanate crosslinking agent, melamine crosslinking agent or the like can be used as a curing agent. When glycidyl groups or isocyanate groups exist in the block polymer, a low molecular compound or high molecular compound, which can react with such groups, can be added to three-dimensionally cure the block polymer. When methylol groups, methoxymethyl groups, trimethylsilyl groups or the like exist in the block polymer, a compound capable of reacting with such groups can also be added and reacted, whereby the block polymer can be caused to undergo self-condensation into a three-dimensional structure.

EXAMPLES

The present invention will next be described more specifically based on production examples, examples and comparative examples, although the present invention shall not be limited at all by these examples. It is to be noted that all designations of "parts" and "%" in the subsequent description are on a weight basis.

Synthesis Example 1

Synthesis of A-B Block Polymer Having Glycidyl Groups Reacted with Di-n-Butylamine Into a reaction vessel fitted with a stirrer, reflux condenser, thermometer and nitrogen inlet tube, propylene glycol monomethyl ether acetate (hereinafter abbreviated as "PGMAc") (100 parts), iodine (3.0 parts), 2,2'-azobis(isobutyronitrile) (hereinafter abbreviated as "AIBN") (5.9 parts), methyl methacrylate (hereinafter abbreviated as "MMA") (75 parts) and diethyl phosphite (hereinafter abbreviated as "DEP") (0.766 parts) were charged, and with nitrogen bubbling, polymerization was conducted at 80° C. for 2 hours to form an A block. The polymerization mixture was sampled, and its solid content was measured. The polymerization conversion rate as calculated from the nonvolatile content was 100%. Further, Mn as measured by a visible light detector (hereinafter abbreviated as "RI") of GPC was 2,700, and PDI was 1.22.

Glycidyl methacrylate (hereinafter abbreviated as "GMA") (17.8 parts) was then added, and polymerization was conducted further at the same temperature for 2 hours to form a D block. The polymerization mixture was sampled, and its solid content was measured. The polymerization conversion rate as calculated from the nonvolatile content was 99%. Mn as measured at that time by RI of GPC was 2,900, and PDI was 1.28. As the molecular weight increased from the A block, the resultant polymer is considered to have been converted into an A-B polymer block.

Di-n-butylamine (hereinafter abbreviated as "DBA") (16.2 parts) was then added, followed by a reaction at 80° C. for 3 hours to convert the D block into a B block. The reaction mixture was sampled, and its solid content was measured. The conversion rate as calculated from the nonvolatile content was 95%. Mn as measured by RI of GPC was 3,000, and PDI was 1.35. This block polymer will be designated as "BR-1".

Synthesis Example 2

Synthesis of A-B Block Polymer Having Glycidyl Groups Reacted with Diphenylamine Into a similar reaction vessel as in Synthesis Example 1, PGMAc (150 parts), iodine (3.0 parts), AIBN (5.9 parts), benzyl methacrylate (hereinafter abbreviated as "BzMA") (132.2 parts) and N-iodosuccinimide (hereinafter abbreviated as "NIS") (0.067 parts) were charged, and with nitrogen bubbling, polymerization was conducted at 80° C. for 3 hours to form an A block. The polymerization mixture was sampled, and its solid content was measured. The polymerization conversion rate as calculated from the nonvolatile content was 100%. Mn as measured by RI at that time was 5,400, and PDI was 1.24. An absorption aromatic ring was observed when measured by an ultraviolet detector (measurement wavelength: 254 nm, hereinafter abbreviated as "UV"). Mn as measured by UV was 5,300, and PDI was 1.25.

GMA (35.6 parts) was then added, and polymerization was conducted further at the same temperature for 3 hours to form a D block. The polymerization mixture was sampled, and its solid content was measured. The polymerization conversion rate as calculated from the nonvolatile content was 99%. Mn as measured at that time by RI of GPC was 6,000, and PDI was 1.29. Mn as measured by UV was 5,900, and PDI was 1.30. As the molecular weight increased from the A block and Mn as measured by UV was increased likewise, a block polymer is considered to have been obtained.

Diphenylamine (42.3 parts) was then added, followed by a reaction at 80° C. for 3 hours to convert the D block into a B block. The reaction mixture was sampled, and its solid content was measured. The conversion rate as calculated from the nonvolatile content was 98%. When the molecular weight was measured by GPC, Mn as measured by RI was 6,500, and PDI was 1.32. This block polymer will be designated as "BR-2".

Synthesis Example 3

Synthesis of A-B Block Polymer Having Glycidyl Groups Reacted with Di-n-Butylamine Into a similar reaction vessel as in Synthesis Example 1, PGMAc (250 parts), iodine (6.0 parts), AIBN (10.8 parts), n-butyl methacrylate (hereinafter abbreviated as "BMA") (213.3 parts) and NIS (0.134 parts) were charged, and with nitrogen bubbling, polymerization was conducted at 80° C. for 3 hours to form an A block. The polymerization mixture was sampled, and its solid content was measured. The polymerization conversion rate as calculated from the nonvolatile content was 100%. Mn as measured by RI of GPC at that time was 4,000, and PDI was 1.26.

GMA (42.6 parts) was then added, and polymerization was conducted further at the same temperature for 3 hours to form a D block. The polymerization mixture was sampled, and its solid content was measured. The polymerization conversion rate as calculated from the nonvolatile content was 99%. Mn as measured at that time by RI of GPC was 5,500, and PDI was 1.34. DBA (38.8 parts) was then added, followed by a reaction at 80° C. for 3 hours to convert the D block into a B block. The reaction mixture was sampled, and its solid content was measured. The conversion rate as calculated from the nonvolatile content was 98%. When the molecular weight was measured by GPC, the number average molecular weight (Mn) was 6,000, and PDI was 1.36. This block polymer will be designated as "BR-3".

Synthesis Example 4

Synthesis of A-B-C (A=C) Block Polymer Having Glycidyl Groups Reacted with Di-n-Butylamine Into a similar reaction vessel as in Synthesis Example 1, PGMAc (100 parts), iodine (3.0 parts), AIBN (5.9 parts), MMA (75 parts) and NIS (0.067 parts) were charged, and with nitrogen bubbling, polymerization was conducted at 80° C. for 2 hours to form an A block. The polymerization mixture was sampled, and its solid content was measured. The polymerization conversion rate as calculated from the nonvolatile content was 100%. Mn as measured by RI of GPC at that time was 2,800, and PDI was 1.23.

GMA (17.8 parts) was then added, and polymerization was conducted further at 80° C. for 2 hours to form a D block. The polymerization mixture was sampled, and its solid content was measured. The polymerization conversion rate as calculated from the nonvolatile content was 99%. Mn as measured at that time by RI of GPC was 3,000, and PDI was 1.25.

MMA (50 parts) with AIBN (0.06 parts) and NIS (0.006 parts) dissolved therein was then added, followed by polymerization at the same temperature for 2 hours to form a C block. The conversion rate as calculated from the nonvolatile content was 99%. Mn as measured at that time by RI of GPC was 3,500, and PDI was 1.37. DBA (16.2 parts) was then added, followed by a reaction at 80° C. for 3 hours to convert the D block into a B block. The reaction mixture was sampled, and its solid content was measured. The conversion rate as calculated from the nonvolatile content was 95%. Mn as measured by RI of GPC was 4,000, and PDI was 1.43. This block polymer will be designated as "BR-4".

Synthesis Example 5

Synthesis of A-B-C Block Polymer Having Glycidyl Groups Reacted with Di-n-Butylamine Into a similar reaction vessel as in Synthesis Example 1, PGMAc (100 parts), iodine (3.0 parts), AIBN (5.9 parts), MMA (75 parts) and 2,6-di-t-butyl-4-methylphenol (hereinafter abbreviated as "BHT") (0.33 parts) were charged, and with nitrogen bubbling, polymerization was conducted at 80° C. for 2 hours to form an A block. The polymerization mixture was sampled, and its solid content was measured. The polymerization conversion rate as calculated from the nonvolatile content was 100%. Mn as measured at that time by RI of GPC was 2,800, and PDI was 1.25.

GMA (17.8 parts) was then added, and polymerization was conducted further at 80° C. for 2 hours to form a D block. The polymerization mixture was sampled, and its solid content was measured. The polymerization conversion rate as calculated from the nonvolatile content was 99%. Mn as measured at that time by RI of GPC was 2,900, and PDI was 1.26.

BzMA (30 parts) with AIBN (0.03 parts) and BHT (0.03 parts) dissolved therein was then added, followed by polymerization at the same temperature for 2 hours to form a C block. The conversion rate as calculated from the nonvolatile content was 99%. Mn as measured at that time by RI of GPC was 4,000, and PDI was 1.33. On the above-described A-B block polymer, no absorption was detected by UV. However, an absorption was observed as a result of copolymerization of BzMA, Mn as measured by UV was 4,100, and PDI was 1.32.

DBA (16.2 parts) was then added, followed by a reaction at 80° C. for 3 hours to convert the D block into a B block. The reaction mixture was sampled, and its solid content was measured. The conversion rate as calculated from the nonvolatile content was 95%. Mn as measured by RI of GPC was 4,500, and PDI was 1.39. This block polymer will be designated as "BR-5".

Synthesis Example 6

Synthesis of A-B Block Polymer Having Glycidyl Groups Reacted with Polyethylenimine Into a similar reaction vessel as in Synthesis Example 1, propylene glycol monomethyl ether (hereinafter abbreviated as "PGM") (150 parts), iodine (3.0 parts), 2,2'-azobis(2,4-dimethylvaleronitrile) ("V-65", product of Wako Pure Chemical Industries, Ltd.; hereinafter called "V-65") (9.0 parts), BzMA (176.2 parts), 2-ethylhexyl methacrylate (hereinafter abbreviated as "2EHMA") (59.5 parts), BMA (28.4 parts), MMA (50.0 parts), NIS (0.5 parts) and dilauroyl peroxide (3.0 parts) were charged, and with nitrogen bubbling, polymerization was conducted at 70° C. for 3 hours to form an A block. The polymerization mixture was sampled, and its solid content was measured. The polymerization conversion rate as calculated from the nonvolatile content was 100%. Mn as measured at that time by RI was 12,000, and PDI was 1.30. Further, Mn as measured by UV was 12,200, and PDI was 1.29.

GMA (28.4 parts) was then added, and polymerization was conducted further at the same temperature for 3 hours to form a D block. The polymerization mixture was sampled, and its solid content was measured. The polymerization conversion rate as calculated from the nonvolatile content was 99%. Mn as measured at that time by RI of GPC was 13,000, and PDI was 1.31. On the other hand, Mn as measured by UV was 13,000, and PDI was 1.31. As the molecular weight increased from the A block and Mn as measured by UV was increased likewise, a block polymer is considered to have been obtained.

Polyethylenimine (molecular weight: 1,800) (10.0 parts) was then added, followed by a reaction at 80° C. for 3 hours to convert the D block into a B block. The reaction mixture was sampled, and its solid content was measured. The conversion rate as calculated from the nonvolatile content was 99%. When the molecular weight was measured by GPC, Mn as measured by RI was 13,500, and PDI was 1.35. This block polymer will be designated as "BR-6".

Synthesis Example 7

Synthesis of A-B Block Polymer Having Glycidyl Groups Reacted with Polyethylenimine Into a similar reaction vessel as in Synthesis Example 1, PGM (150 parts), iodine (3.0 parts), "V-65" (9.0 parts), 2EHMA (69.4 parts), ethyl methacrylate (hereinafter called "EMA") (37.1 parts), MMA (32.5 parts), NIS (0.2 parts) and dilauroyl peroxide (1.5 parts) were charged, and with nitrogen bubbling, polymerization was conducted at 70° C. for 3 hours to form an A block. The polymerization mixture was sampled, and its solid content was measured. The polymerization conversion rate as calculated from the nonvolatile content was 100%. Mn as measured at that time by RI was 6,200, and PDI was 1.24.

GMA (14.2 parts) was then added, and polymerization was conducted further at the same temperature for 3 hours to form a D block. The polymerization mixture was sampled, and its solid content was measured. The polymerization conversion rate as calculated from the nonvolatile content was 99%. Mn as measured at that time by RI of GPC was 6,300, and PDI was 1.25. Mn as measured by UV was 6,400, and PDI was 1.27.

Polyethylenimine (molecular weight: 1,200) (6.0 parts) was then added, followed by a reaction at 80° C. for 3 hours to convert the D block into a B block. The reaction mixture was sampled, and its solid content was measured. The conversion rate as calculated from the nonvolatile content was 99%. When the molecular weight was measured by GPC, Mn as measured by RI was 6,400, and PDI was 1.40. This block polymer will be designated as "BR-7".

Comparative Example 1

Synthesis of Random Copolymer

Into a similar reaction vessel as in Synthesis Example 1, PGMAc (150 parts) was charged, followed by heating to 80° C. Subsequently, a monomer solution of AIBN (5.9 parts) in MMA (75 parts) and GMA (17.8 parts), which had been prepared beforehand in a separate vessel, was added dropwise into the reaction vessel over 1.5 hours. After completion of the dropwise addition, polymerization was conducted further at the same temperature for 3 hours. The polymerization mixture was sampled, and its solid content was measured. The polymerization conversion rate as calculated from the nonvolatile content was 100%.

DBA (16.2 parts) was then added, followed by a reaction at 80° C. for 3 hours. The reaction mixture was sampled, and its solid content was measured. The conversion rate as calculated from the nonvolatile content was 98%. Mn as measured by RI of GPC was 15,000, and PDI was 2.03. This copolymer will be designated as "A-1".

Synthesis Example 8

Synthesis of A-B Block Polymer Having Isocyanate Groups Reacted with 4-Pyridineethanol Into a similar reaction vessel as in Synthesis Example 1, PGMAc (100 parts), 2-iodo-2-cyanopropane (2.2 parts), dilauroyl peroxide (4.4 parts), MMA (42 parts), BMA (39.7 parts) and 4-t-butyl-2,6-xylenol (hereinafter abbreviated as "IA") (0.25 parts) were charged, and with nitrogen bubbling, polymerization was conducted at 80° C. for 2 hours to form an A block. The polymerization mixture was sampled, and its solid content was measured. The polymerization conversion rate as calculated from the nonvolatile content was 100%. Mn as measured by GPC was 4,200, and PDI was 1.21.

Methacryloxyethyl isocyanate ("KARENZ MOI", product of Showa Denko K.K.; hereinafter called "MOI") (7.6 parts) was then added, and polymerization was conducted further at the same temperature for 3 hours to form a D block. The polymerization mixture was sampled, and its solid content was measured. The polymerization conversion rate as calculated from the nonvolatile content was 99%. Mn was 4,420, and PDI was 1.34.

The polymerization mixture was then cooled to 50° C., and upon addition of 4-pyridineethanol (6.1 parts), an exotherm was observed. At the same temperature, a reaction was conducted for 1 hour to convert the D block into a B block. An IR spectrum was measured, but no peak of isocyanate group was observed. The polymerization mixture was sampled, and its solid content was measured. The conversion rate as calculated from the nonvolatile content was 95%, and a pale-brown, clear liquid was obtained. When the molecular weight was measured by GPC, Mn as measured by RI was 4,460, and PDI was 1.37. Owing to the inclusion of a pyridine ring, a peak was detected by UV. Mn was 4,475, and PDI was 1.38. This block polymer will be designated as "BR-8".

Synthesis Example 9

Synthesis of A-B Block Polymer Having Isocyanate Groups Reacted with 2-Amino-N-Ethylcarbazole A reaction was conducted in a similar manner as in Synthesis Example 8 except that the 4-pyridineethanol was changed to 2-amino-N-ethylcarbazole (10.3 parts). The conversion rate was 98%, and a dark-brown, clear liquid was obtained. When the molecular weight was measured by GPC, Mn and PDI were found to be 4,670 and 1.40, respectively. Mn as measured by UV was 4,710, and PDI was 1.42. This block polymer will be designated as "BR-9".

Synthesis Example 10

Synthesis of A-B Block Polymer Having Isocyanate Groups Reacted with N-(3-Aminophenyl)-3-hydroxy-2-naphthamide Into a similar reaction vessel as in Synthesis Example 1, diethylene glycol dimethyl ether (hereinafter called "diglyme") (100 parts), iodine (1.8 parts), "V-65" (5.3 parts), MMA (71.1 parts), AA (12.8 parts) and IA (0.32 parts) were charged, followed by stirring at 70° C. for 2 hours to form an A block. The polymerization mixture was sampled, and its solid content was measured. The polymerization conversion rate as calculated from the nonvolatile content was 100%. Mn as measured by GPC was 4,970, and PDI was 1.51.

MOI (8.2 parts) was then added, and polymerization was conducted further for 4 hours to form a D block. The polymerization mixture was sampled, and its solid content was measured. The polymerization conversion rate as calculated from the nonvolatile content was 99%. (The resulting block polymer will be designated as "the intermediate resin-1".) Mn as measured by GPC was 5,120, and PDI was 1.55.

The polymerization mixture was then cooled to 50° C., and upon addition of N-(3-aminophenyl)-3-hydroxy-2-naphthamide (12.4 parts) to convert the D block into a B block, an exotherm was observed. At the same temperature, a reaction was conducted for 1 hour. In IR measurement, no peak of isocyanate group was observed. The polymerization mixture was sampled, and its solid content was measured. The conversion rate as calculated from the nonvolatile content was 95%, and a dark-brown, clear liquid was obtained. When the molecular weight was measured by GPC, Mn and PDI were found to be 5,200 and 1.55, respectively. By UV, a significant absorption was observed, and a similar molecular weight was determined.

Deionized water (1,500 parts) was next added to a 3-L beaker mounted on a high-speed stirrer, the resin solution obtained as described above was added to the deionized water, and the resin was allowed to precipitate. The resin was collected by filtration, and was dried to obtain a slightly-white brown powder. This powder will be designated as "the intermediate resin-2".

Water (500 parts) was placed in a 1-L beaker, and was then cooled to 5° C. or lower. Aniline (10.3 parts) was charged into the water. Concentrated hydrochloric acid (330 parts) was added, and then, 10% sodium nitrite (138 parts) was added to conduct diazotization.

Into a separate vessel, the intermediate resin-1 (206.6 parts), a 5% aqueous solution of sodium hydroxide (678 parts) and deionized water (2,181 parts) were charged. The intermediate resin-1 was dissolved, and the resulting solution was cooled to 5° C. As a result, the solution was turned into a yellow-brown, clear solution. To the yellow-brown, clear solution, the aqueous diazo solution obtained as described above was added to conduct a coupling reaction. As a result, the reaction system turned red, and a yellowish red powder was obtained. The powder was collected by filtration, washed thoroughly with water, and then dried to obtain a slightly-white, yellowish red powdery resin.

When the red powdery resin (40 parts), aqueous ammonia (4.5 parts) and water (55.5 parts) were mixed, an aqueous solution of the yellowish red resin was obtained. The aqueous solution was clear, and had high viscosity. This resin solution will be designated as "BR-10". When the resin solution was diluted 10-fold with water, the resin solution turned into a clear red solution with the resin dissolved therein.

Synthesis Example 11

Treated Pigment Obtained by Treating Pigment with Isocyanato-Containing Block Polymer A commercial pigment yellow PY-74 (100 parts), common salt (700 parts) and diethylene glycol (200 parts) were charged into a 3-L kneader. The kneader was controlled to maintain its temperature at from 100° C. to 120° C., at which milling was performed for 8 hours. The resulting kneaded mixture (800 parts) was then charged into water (2,000 parts), and the thus-obtained mixture was stirred at high speed for 4 hours. Filtration and drying were then conducted to obtain a water-based paste (pigment content: 32.0%).

In addition, a pigment analogous compound of the following structure:

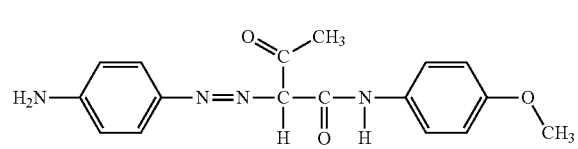 [SMILES: COc1ccc(NC(=O)C(N=Nc2ccc(N)cc2)C(C)=O)cc1]

(which had been obtained by conducting diazo coupling of para-nitroaniline as a diazo component and aceto acet para-anisidide as a coupler component and reducing the nitro group by a conventional method) (10 parts), acetic acid (2.2 parts) and water (187.8 parts) were mixed. A slightly-dull, bluish yellow liquid was formed.

In a 3 L-beaker, the above-described water-based paste of PY-74 (100 parts) and deionized water (500 parts) were then stirred at high speed into a slurry. The above-described aqueous solution of the acetated pigment analogous compound (38.4 parts) was added, followed by stirring at 2,000 rpm for 3 hours. Subsequently, 28% aqueous ammonia was gradually added to adjust the pH to 9.8. The pigment solution was then filtered, and the resulting filter cake was washed, dried, powderized, and then ground. The thus-ground product will be designated as "the treated pigment-1". This is a treated pigment carrying the pigment analogous compound deposited on pigment surfaces and having amino groups on the surfaces.

The treated pigment-1 (15 parts), diglyme (81.8 parts and the intermediate resin-1 (solid content: 47.2%) (3.2 parts) obtained in Synthesis Example 10 were added to a 250-mL plastic bottle, were stirred for 1 hour in a disper mixer, and were then dispersed together with 0.5-mm zirconia beads (250 parts) for 5 hours by a paint conditioner. The average particle size at that time was 87.2 nm.

When the dispersion was added to water (1,000 parts) with stirring at high speed, a yellow powder was allowed to precipitate. Subsequent to further stirring for 1 hour, the precipitates were collected by filtration and washed to obtain a water-based paste. The yield was 16.2 parts. This will be designated as "the treated pigment BR-11".

Synthesis Example 12

Synthesis of A-B Block Polymer Having Isocyanate Groups Reacted with Violet Azo Pigment Into a similar reaction vessel as in Synthesis Example 1, diglyme (88 parts), iodine (0.5 parts), "V-65" (2.0 parts), MMA (15 parts), ethoxydiethylene glycol methacrylate (23.7 parts), 2EHMA (19.8 parts) and succinimide (0.02 parts) were added, and with nitrogen bubbling, polymerization was conducted at 60° C. for 5 hours to form an A block. The polymerization mixture was sampled, and its solid content was measured. The polymerization conversion rate as calculated from the nonvolatile content was 100%. Mn as measured by GPC was 7,800, and PDI was 1.41.

A mixture of MMA (13.6 parts) and MOI (13.0 parts) was then added, followed by a reaction for 3 hours to form a D block. The reaction mixture was sampled, and its solid content was measured. The polymerization conversion rate as calculated from the nonvolatile content was 100%. Mn as measured by GPC was 9,900, and PDI was 1.50. This D block will be designated as "BR-12". It is to be noted that no molecular weight was detected by the UV detector as no absorption occurred at 254 nm as its detection wavelength.

A solution of a violet pigment compound, N-(3-aminophenyl)-3-((9-ethyl-9H-carbazol-3-yl)diazenyl)-2-naphthamide, of the following structure:

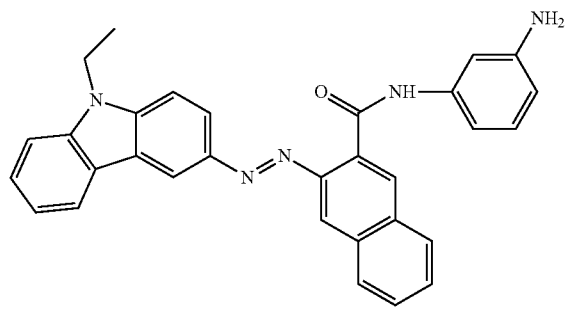 [SMILES: CCn1c2ccccc2c2cc(/N=N/c3cc4ccccc4cc3C(=O)Nc3cccc(N)c3)ccc21]

(32 parts) in N-methylpyrrolidone (217 parts) was then added. The resulting mixture was heated to 100° C., at which a reaction was conducted for 2 hours. After the reaction, butylamine (1 parts) was added such that the remaining isocyanate groups were reacted to form a B block. The molecular weight as measured at that time by GPC was 8,000, and PDI was 1.31. This B block will be designated as "BR-12".

The molecular weight as measured by the UV detector was 8,100, and PDI was 1.32. Although no UV absorption occurred after the formation of the B block, the reaction of the dye is considered to have resulted in the occurrence of an absorption, and hence, to have made it possible to measure the molecular weight by the UV detector. It is also considered that, when the dye was bonded, the molecular weight decreased as a result of absorption of UV by a column and aggregation of D blocks as dye blocks in the solvent.

Synthesis Example 13

Synthesis of A-B Block Polymer Having Isocyanate Groups Reacted with Yellow Anthraquinone Pigment Synthesis was conducted in a similar manner as in Synthesis Example except that the polymerization recipes were changed to the followings:

| A block | |
|---|---|
| MMA | 15 parts |
| EMA | 17.1 parts |
| BzMA | 26.4 parts |
| 2EHMA | 29.7 parts |
| Mn of the resultant A block: 11,270 | |
| PDI of the resultant A block: 1.42 | |
| B block | |
| MMA | 15 parts |
| MOI | 7.8 parts |
| Mn of the resultant block polymer: 12,600 | |
| PDI of the resultant block polymer: 1.50 | |

A solution of a yellow pigment compound, 1-(2-aminophenylthio)anthraquinone, of the following structure:

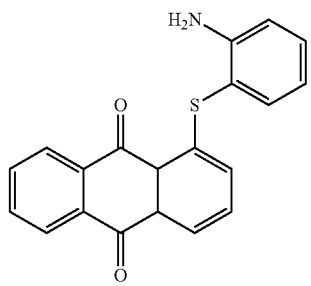 [SMILES: Nc1ccccc1SC1=CC=CC2C(=O)c3ccccc3C(=O)C12]

(13.8 parts) in N-methylpyrrolidone (136.2 parts) was then added. The resulting mixture was heated to 100° C., at which a reaction was conducted for 2 hours. After the reaction, butylamine (1 parts) was added such that the remaining isocyanate groups were reacted to form a B block. The molecular weight as measured at that time by GPC was 13,200, and PDI was 1.41. This B block will be designated as "BR-13".

Example 1

Application to Color Filter

To an acrylic resin varnish (acrylic resin: polymerization product of benzyl methacrylate/methacrylic acid/2-hydroxyethyl methacrylate at a weight ratio of 70/15/15, molecular weight: 12,000, acid value: 100; PGMAc solution having 40% solid content) (50 parts), PR-254 (diketopyrrolopyrrole pigment) (15 parts), BR-1 (5 parts) obtained in Synthesis Example 1 and PGMAc (30 parts) were added. Subsequent to premixing, dispersion was conducted in a horizontal bead mill to obtain a pigment dispersion. This dispersion will be designated as "R-1".

Examples 2 to 7

Pigment dispersions were obtained in a similar manner as in Example 1 except that BR-2 to BR-7 obtained in Synthesis Examples 2 to 7 were used in place of BR-1. These pigment dispersions will be designated as "R-2" to "R-7".

Examples 8 to 13

Pigment dispersions were obtained in a similar manner as in Example 1 except that PR-177 (anthraquinone pigment) was used in place of PR-254 and BR-1, BR-3, BR-6, BR-8, BR-10 and BR-13 obtained in Synthesis Examples 1, 3, 6, 8, 10 and 13 were used in place of BR-1. This pigment dispersions will be designated as "R-8" to "R-13".

Example 14

A pigment dispersion was obtained in a similar manner as in Example 1 except that PV-23 (dioxazine violet pigment) was used in place of PR-254 and BR-12 obtained in Synthesis Example 12 was used in place of BR-1. This pigment dispersion will be designated as "V-1".

Comparative Example 1

A pigment dispersion was obtained in a similar manner as in Example 1 except that A-1 obtained in Comparative Synthesis Example was used in place of BR-1. This pigment dispersion will be designated as "R-14".

Comparative Example 2

A pigment dispersion was obtained in a similar manner as in Example 1 except that A-1 obtained in Comparative Synthesis Example was used in place of BR-1 and PR-177 was used in place of PR-254. This pigment dispersion will be designated as "R-15".

The pigment dispersions of the above-described examples, which were useful for color filters, were evaluated for viscosity and coated surface gloss, and were also confirmed as to whether or not aggregates would occur. The evaluation of the pigment dispersions for color filters for viscosity and coated surface gloss and the observation as to whether or not aggregates would occur were performed by the below-described methods. The evaluation was performed shortly after their production and also after their storage at room temperature for 1 month.

Viscosity: The viscosity (mPa·s) of each pigment dispersion was measured shortly after its production and after its storage at 25° C. for 1 month by a cone-plate type rotational viscometer under conditions of room temperature (25° C.) and 60 rpm rotator speed.

Gloss: Each pigment dispersion was spread by a bar coater (coil wire diameter: 0.45 mm) onto PET films shortly after its production and after its storage at 25° C. for 1 month. The glosses of the coated surfaces were measured by a gloss meter. The evaluation results were indicated as follows:

A: good, B: fairly good, C: bad

Observation for aggregates: Each pigment dispersion was coated by a spinner onto glass substrates shortly after its production and after its storage at 25° C. for 1 month. After dried at 90° C. for 2 minutes, each coating was observed at ×200 magnification under a microscope to determine the existence or non-existence of aggregates. The evaluation results were indicated as follows:

A: no aggregates, B: slight aggregates,
C: substantial aggregates

The results of the above evaluations are shown in Table 1.

and contains the pigment in a stably dispersed state without occurrence of aggregates shortly after production and even after storage for 1 month. The block polymer according to the present invention can show excellent dispersing ability for the preparation of a pigment dispersion. Further, the block polymer can be efficiently produced by the production process of the present invention.

INDUSTRIAL APPLICABILITY

The use of the block polymer according to the present invention as a high-molecular dispersant can obtain a pigment dispersion having excellent physical properties, and this pigment dispersion can provide various products such as paints, inks and coating formulations with excellent physical properties to furnish them as high-performance products.

The invention claimed is:

1. A pigment dispersion comprising at least a pigment, a liquid medium and a polymer dispersant, wherein:
   the liquid medium is water or at least one organic solvent;
   the polymer dispersant is a block polymer represented by A-B in which A and B each represent a polymer block formed from an ethylenically-unsaturated monomer;
   the A block is formed from an ethylenically-unsaturated monomer (monomer a) which is free of an amino group or hydroxyl group; and
   the B block is a polymer block which comprises a monomer unit having a urethane bond or a urea bond.

2. The pigment dispersion according to claim 1, wherein the block polymer A-B is a block polymer represented by A-D, said block polymer A-D obtained by living radical polymerization of the monomer a and a monomer b having an isocyanate group while using an iodine compound as an initiating compound and a phosphorus compound, nitrogen compound, or oxygen compound as a catalyst, and the B block is formed by reacting one of an amino compound E-1 and a hydroxyl-containing compound E-2 to the isocyanate group of the D block.

TABLE 1

|  | Dispersion | Dispersant | Pigment | Viscosity (mPa·s) | | Gloss | | Aggregates | |
| --- | --- | --- | --- | --- | --- | --- | --- | --- | --- |
|  |  |  |  | Shortly after production | After storage | Shortly after production | After storage | Shortly after production | After storage |
| Ex. 1 | R-1 | BR-1 | PR-254 | 9.5 | 10.6 | A | A | A | A |
| Ex. 2 | R-2 | BR-2 | PR-254 | 8.9 | 9.6 | A | A | A | A |
| Ex. 3 | R-3 | BR-3 | PR-254 | 10.3 | 11.3 | A | A | A | A |
| Ex. 4 | R-4 | BR-4 | PR-254 | 11.5 | 11.6 | A | A | A | A |
| Ex. 5 | R-5 | BR-5 | PR-254 | 10.1 | 10.3 | A | A | A | A |
| Ex. 6 | R-6 | BR-6 | PR-254 | 9.7 | 9.9 | A | A | A | A |
| Ex. 7 | R-7 | BR-7 | PR-254 | 10.5 | 10.4 | A | A | A | A |
| Ex. 8 | R-8 | BR-1 | PR-177 | 9.7 | 10.0 | A | A | A | A |
| Ex. 9 | R-9 | BR-3 | PR-177 | 11.8 | 11.9 | A | A | A | A |
| Ex. 10 | R-10 | BR-6 | PR-177 | 12.4 | 12.9 | A | A | A | A |
| Ex. 11 | R-11 | BR-8 | PR-177 | 9.3 | 10.0 | A | A | A | A |
| Ex. 12 | R-12 | BR-10 | PR-177 | 8.3 | 8.6 | A | A | A | A |
| Ex. 13 | R-13 | BR-13 | PR-177 | 9.5 | 9.8 | A | A | A | A |
| Ex. 14 | V-1 | BR-12 | PV-23 | 8.7 | 9.5 | A | A | A | A |
| Comp. Ex. 1 | R-14 | A-1 | PR-254 | 12.3 | 69.8 | C | C | C | C |
| Comp. Ex. 2 | R-15 | A-1 | PR-177 | 11.6 | 54.9 | C | C | C | C |

It has been found from these results that the pigment dispersion making use of the block polymer according to the present invention as a high-molecular dispersant does not undergo much change in viscosity with time, is good in gloss, 3. The pigment dispersion according to claim 2, wherein the D block comprises the monomer unit having the isocyanate group in an amount of more than 50 mol % of the monomer unit of the D block.

4. The pigment dispersion according to claim 1, wherein a content of the B block in the polymer dispersant is from 1 to 60 wt. %.

5. The pigment dispersion according to claim 1, wherein the polymer dispersant has a number average molecular weight of from 1,000 to 30,000.

6. The pigment dispersion according to claim 1, wherein the polymer dispersant has a polydispersity index (weight average molecular weight/number average molecular weight) of from 1.05 to 1.7.

\* \* \* \* \*